United States Patent [19]

Mikulas, Jr. et al.

[11] Patent Number: 4,604,844
[45] Date of Patent: Aug. 12, 1986

[54] DEPLOYABLE M-BRACED TRUSS STRUCTURE

[75] Inventors: Martin M. Mikulas, Jr., Williamsburg; Marvin D. Rhodes, Yorktown, both of Va.

[73] Assignee: The United States of America as represented by the Administrator of the National Aeronautics and Space Administration, Washington, D.C.

[21] Appl. No.: 760,378

[22] Filed: Jul. 30, 1985

[51] Int. Cl.⁴ .................. E04H 12/18; E04G 25/04
[52] U.S. Cl. .................................. 52/632; 52/111; 52/645; 52/646
[58] Field of Search .............. 52/632, 111, 118, 645, 52/646

[56] References Cited

U.S. PATENT DOCUMENTS

| | | | |
|---|---|---|---|
| 253,520 | 2/1882 | Du Bois | 52/645 X |
| 1,073,925 | 9/1913 | Pichler | 52/632 |
| 1,802,373 | 4/1931 | Byers | 52/632 X |
| 2,176,965 | 10/1939 | Haynes | 52/646 X |
| 3,213,575 | 10/1985 | Boczek . | |
| 3,693,309 | 9/1972 | Kutchai | 52/632 |
| 3,830,031 | 8/1974 | Solsson . | |
| 3,835,612 | 9/1974 | Beziat | 52/646 X |
| 3,885,648 | 5/1985 | Beziat . | |
| 4,089,147 | 5/1985 | Bain . | |

FOREIGN PATENT DOCUMENTS

| | | | |
|---|---|---|---|
| 108001 | 6/1958 | Pakistan | 52/646 |
| 643615 | 1/1979 | U.S.S.R. | 52/111 |

*Primary Examiner*—Alfred C. Perham
*Attorney, Agent, or Firm*—Howard J. Osborn; Wallace J. Nelson; John R. Manning

[57] ABSTRACT

The disclosure relates to a deployable M-braced truss structure that is efficiently packaged into a compact stowed position and expandable to an operative position at the use site. The M-braced configuration effectively separates tension-compression and shear in the structure and permits efficient structural design. Both diagonals and longerons telescope from an M-braced base unit. They are deployed either pneumatically, mechanically by springs or cables, or by powered reciprocating mechanisms. Upon full deployment, the diagonals and longerons lock into place with a simple latch mechanism.

5 Claims, 3 Drawing Figures

DEPLOYABLE M-BRACED TRUSS STRUCTURE

ORIGIN OF THE INVENTION

The invention described herein was made by employees of the United States Government and may be used by or for the Government for governmental purposes without the payment of any royalties thereon or therefor.

TECHNICAL FIELD

The present invention relates to a deployable M-braced truss which can be folded for efficient packaging.

BACKGROUND ART

Many space operations of the future will require the use of long lightweight deployable booms. These booms have application in a number of areas such as a mast to support and accurately position the feed-horn for large antennas, to deploy and provide tension in the blankets of a solar array, or to serve as structural components of a space station or operations center. A number of deployable and/or extendable structural configurations have been proposed in the past, most of which are truss-type structures composed of load carrying axial members (longerons) stabilized by cross-members (battens) and diagonals. The prior art truss configurations have either telescoping or folding longerons connected directly by diagonals, which are generally constructed of cable to facilitate folding and/or packaging. The cable must be pretensioned or the structure will have low shear stiffness until the deformation is adequate to load the diagonal members. However, pretension in the diagonals introduces load in the longerons making them less efficient structural members. Column or compression loads applied to the longerons will also reduce the tension in the wire diagonals.

Some of these problems can be overcome by using diagonals fabricated from members that have bending stiffness adequate to support compression loads. However, trusses with single diagonals may introduce bending or kick loads in the longerons when the truss is loaded in compression. Trusses with cross-diagonals, while eliminating this problem, are more difficult to fold and the diagonals must be adequate to support not only loads introduced by shear, but structural redundancy causes part of the axial load to be introduced in the diagonals. Trusses with folding members also require the lengths of all members to be precisely set and the stiffness of the deployed structure is significantly affected by tolerance in the joints.

STATEMENT OF THE INVENTION

The present invention, is directed toward an efficiently packaged deployable M-braced truss, and eliminates or minimizes the problems of prior art systems. In an M-braced truss, the diagonals intersect at the center of the batten which is more structurally efficient than the traditional truss where diagonals intersect at the batten-longeron intersection. The present invention compactly folds and the diagonals and longerons telescope from a base element. Deployment of the M-braced truss can be performed manually, pneumatically, mechanically, by springs or cables, or by a powered reciprocating mechanism in a conventional manner.

Accordingly, it is an object of the present invention to provide a novel truss structure that can be compactly folded for efficient storage.

Another object of the present invention is to provide a structure that allows packaging of very long truss structures into a single bay area.

Another object of the present invention is a deployable truss structure that can be deployed automatically.

A further object of the present invention is a deployable truss structure that will form a stiff structural column or beam once deployed.

BRIEF DESCRIPTION OF THE DRAWINGS

A more complete appreciation of the invention and many of the attendant advantages thereof will be readily apparent as the same becomes better understood by reference to the following description when considered in connection with the accompanying drawings wherein.

DETAILED DESCRIPTION OF THE INVENTION

This present invention has the advantages of a fixed M-braced truss while also permitting the structure of the truss to be collapsed for compact storage. In an M-braced truss, the diagonal members intersect at the center of a batten rather than at the batten-longeron intersection. This structure allows loads introduced in the diagonals to be reacted by batten bending. Movement associated with joint tolerances are eliminated and ensure the geometric accuracy of the deployable beam by using bending of the batten to preload the diagonals. Bending the batten limits the contribution or interaction of load in the diagonal due to applied axial load. However, the diagonals are effective in reacting shear loads because the triangular pattern cannot be distorted without introducing loads in the diagonal members. Therefore, the M-braced configuration effectively separates tension-compression and shear in the structure and permits an efficient structural design.

Figure 1:
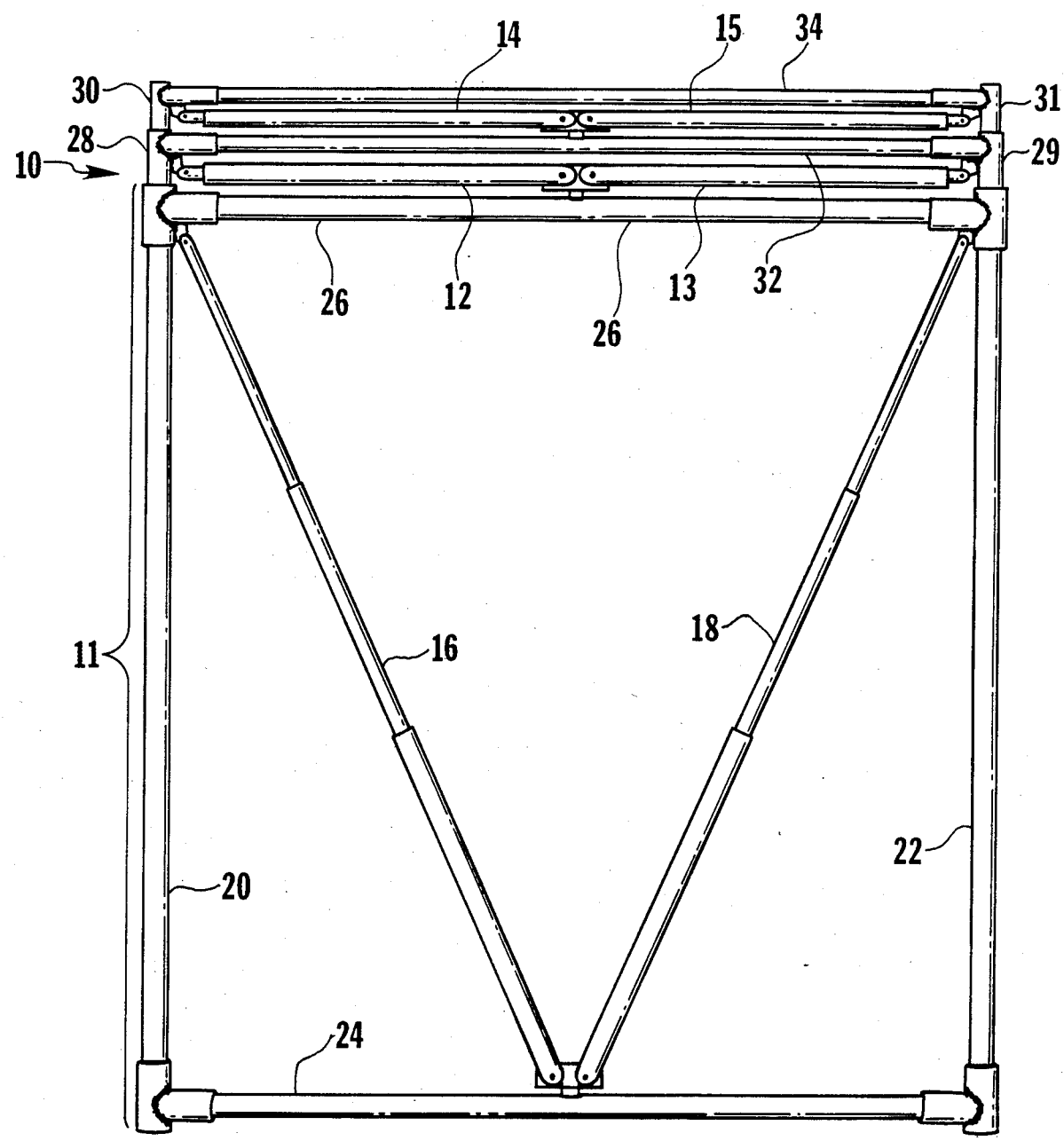
FIG. 1 is a part-schematic view of a compactly folded M-braced truss according to the present invention and having telescoping diagonals and longerons that telescope from a base unit.

An important aspect of the present invention is that the diagonals and longerons telescope from a base element, permitting several sections of the truss to be packaged into a single bay section for launch. Referring now more particularly to FIG. 1, the truss structure of the present invention is shown compactly folded and designated generally by reference numeral 10. In the illustrated embodiment the base or first unit 11 of truss 10 includes diagonals 16,18, longerons 20,22 and battens 24,26.

Figure 2:
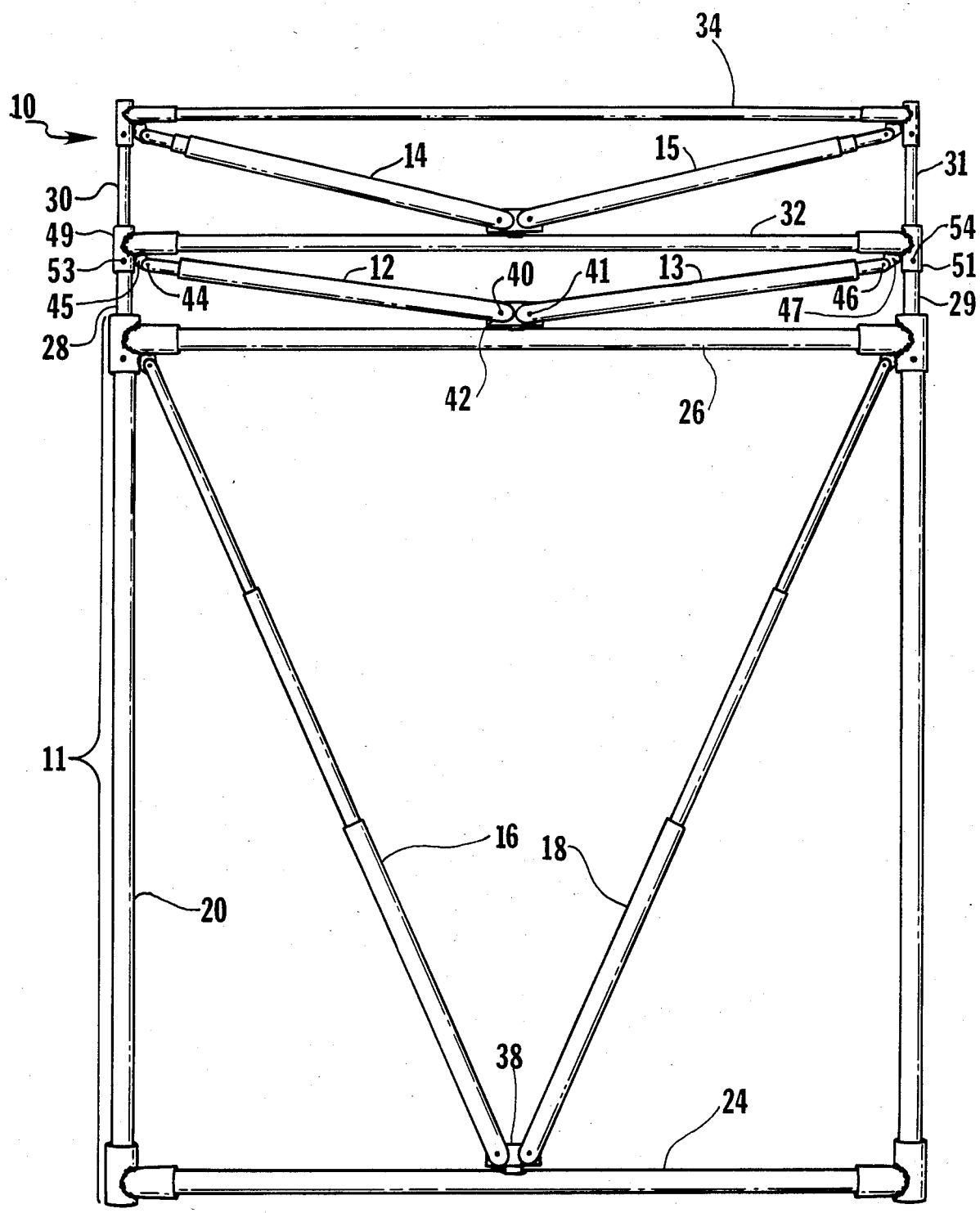
FIG. 2 is a view similar to FIG. 1 illustrating the M-braced truss shown in FIG. 1 in partially deployed condition.

The partially deployed truss 10 as shown in FIG. 2 more clearly illustrates diagonals 12,13, longerons 28,29 and batten 32 which, along with batten 26 of unit 11, constitutes the second or intermediate unit of truss 10. Longeron 32 also connects with diagonals 14,15, and longerons 30,31 which, together with batten 34, forms the third or end unit of the illustrated truss structure 10.

Diagonals 16,18 of the base unit are fixed in the extended position shown while diagonals 12, 13, 14 and 15 in the preferred embodiment are formed of three telescoping segments. Also, the converging ends of diagonals 16,18 are fixed to batten 24 via bracket 38 while the converging ends of diagonals 12,13 and 14,15 are pivotally connected to respective battens 26 and 32. Similarly, the extended ends of diagonals 16,18 are rigidly secured to the respective intersections of longerons 20,22 with batten 26.

Diagonals 12,13 are pivotally connected via pivot pins 40,41, respectively, at their converging ends to a bracket 42 fixed intermediate to batten 26. The extended ends of diagonals 12,13 are pivotally connected via respective pivot pins 44,46 to brackets or ears 45,47 which, in turn, are rigidly secured at the inside area of the rigid corner connection elements 49,51 of longerons 28,29 with batten 32. Corner connection elements 49,51 are formed of two tubular sections welded or otherwise rigidly attached to form a right angle that serves to receive and attach to, respectively, longeron 30, batten 32 and longeron 28; and longeron 31, batten 32 and longeron 29. Similar corner connection elements are provided at each end of battens 24, 26 and 34 but are not elaborated on in the interest of clarity. The vertical leg of corner connection elements 49,51 are provided with transverse openings therein for receiving spring urged latch pins 53,54, respectively, to lock or latch longerons 30,31 in the extended position shown in FIG. 3. The other corner connection elements (not designated) on bottom unit 11 are also provided with similar openings for receiving the spring urged latch pins carried by longerons 28,29. Latch pins 53,54 and those not designated are of similar construction to the conventional latch pins employed on telescoping tent poles.

OPERATION

Figure 3:
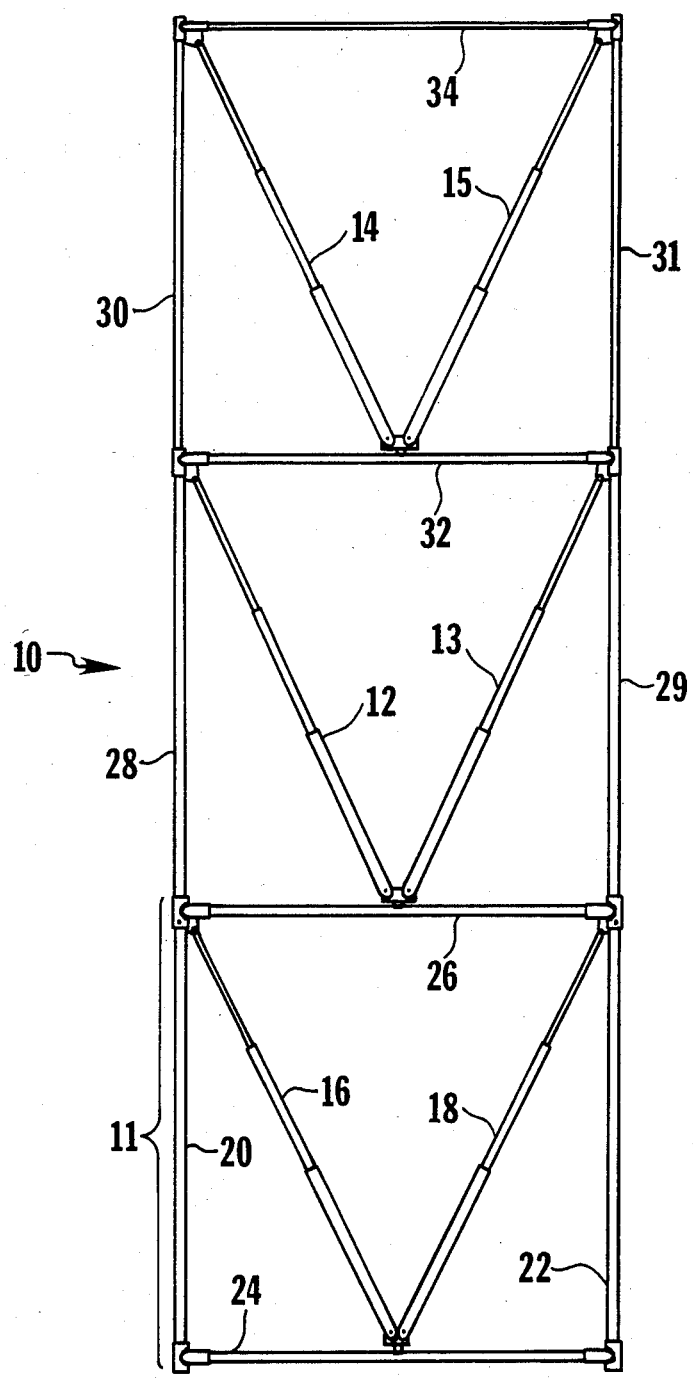
FIG. 3 illustrates the M-braced truss shown in FIGS. 1 and 2 when fully deployed.

The operation of the invention is now believed apparent. When the compactly folded M-braced structure is stowed or retracted, it is as shown in FIG. 1. As longerons 28,29 and 30,31 are deployed, the M-braced diagonals 12,13,14,15 are telescopically expanded and formed as the battens 32,34 are moved away from base unit 11 as shown in progress in FIG. 2. Upon full deployment, the longerons 28,29,30,31 are locked in place by latch pins 53,54 and the diagonals 12,13,14,15 are also locked by similar spring urged pins, not designated, to result in three basic M-braced truss segments as shown in FIG. 3.

Although the invention has been described relative to a three-unit embodiment, the number of units is a design choice and any multiple of units needed for a specific final configuration may be employed and are considered within the scope of the present invention.

Deployment of the M-braced truss can be performed manually pneumatically, mechanically by springs or cables, or by a powered reciprocating mechanism. Component members for the M-braced truss may be fabricated from conventional metallic materials or non-metallic materials such as graphite-epoxy.

Further, although the diagonals 12,13,14,15 are formed of three telescoping sections, it is to be understood that this number may be varied as the design dictates. The preferred embodiment utilizes the base segment for each diagonal as a one-half length of the adjacent batten to facilitate compact stowage. Although longerons 20,28,30 and 22,29,31 are by necessity of decreasing size due to the telescope stowage thereof, the individual diagonals for the extended units remain of the same size since each diagonal unit is separately stowed.

Although the invention has been described relative to a specific embodiment thereof, it is not so limited and numerous variations and modifications thereof will be readily apparent to those skilled in the art in the light of the above teaching. For example, although the specific embodiment selected for illustrating the present invention utilizes only two longerons in each segment it is to be understood that the invention is equally applicable to triangular, square or other multi-side truss segments and the beam segments of such structures would employ three, four, or more longerons in each beam or column segment. It is therefore to be understood that within the scope of the appended claims the invention may be practiced otherwise than as specifically described.

What is claimed as new and desired to be secured by Letters Patent of the United States is:

1. An expandable truss structure formed of multiple interconnected truss units,
    each said truss unit including at least one elongated structural batten, at least one longeron attached to each end of said batten and a pair of diagonal structural members connected at one end thereof to substantially the intermediate length of said elongated structural batten and connected at the other end thereof adjacent to the end of one said longeron, wherein said multiple interconnected truss units comprise a base unit, at least one intermediate unit and an end unit, said base unit having rigidly connected longerons and diagonals attached to said elongated structural batten and said at least one intermediate unit and said end unit each having parts thereof folded and parts thereof telescopically received by said base unit to form a compact structure adapted to be moved from the compact stowed position to an expanded operative truss structure, and wherein the diagonal structural members of said at least one intermediate unit and said end unit are hingedly connected at one end thereof to said elongated batten of the respective unit substantially at the intermediate length thereof.

2. The truss structure of claim 1 including each said diagonal structural member of said at least one intermediate unit and said end unit being formed of telescoping segments and wherein the end segment of each diagonal hingedly connected to said elongated batten is substantially equal to a one-half length of said elongated batten and is adapted to telescopically receive the remaining segments of said diagonal when the truss structure is in the compactly stowed mode.

3. The truss structure of claim 1 including a corner connector element serving to secure the end of each said elongated batten to one end of said at least one longeron, said corner connector being formed of right angle disposed tubular segments, and wherein there are three interconnected truss units disposed in a compact stowed configuration and comprising a base unit, one intermediate unit and an end unit, and
    including latch means for locking the truss structure when expanded or deployed from the compact stowed configuration to an extended use configuration, said latch means including latching parts disposed on said corner connector elements and on an end of said longerons.

4. An M-braced truss structure comprising:
    a plurality of interconnected truss sections,
    each said truss section having at least one elongated structural cross-member or batten, at least one axial structural member or longeron attached to each end of said batten, a pair of diagonal structural members hingedly connected at one end thereof substantially intermediate said batten and hingedly connected at the other end thereof to an end of one said longeron, and each said longeron and each said diagonal being formed of telescoping segments and adapted to be moved from a stowed compressed position to an expanded operative truss structure.

5. The truss of claim 4 including latch means for latching the plurality of truss section in the expanded operative position when deployed to form a stiff structural column or beam.

* * * * *